United States Patent [19]

DuRay

[11] 4,259,832
[45] Apr. 7, 1981

[54] GRASS COLLECTION APPARATUS

[76] Inventor: Harry A. DuRay, 518 Blackburn Ct., Downers Grove, Ill. 60515

[21] Appl. No.: 74,819

[22] Filed: Sep. 12, 1979

[51] Int. Cl.³ .......................................... A01D 35/22
[52] U.S. Cl. .................................................... 56/202
[58] Field of Search ...................... 56/202, 320.2, 13.3, 56/13.4, 203, 204, 205, 206

[56] References Cited

U.S. PATENT DOCUMENTS

| | | | |
|---|---|---|---|
| 3,110,998 | 11/1963 | Goldberg et al. | 56/202 |
| 3,135,080 | 6/1964 | Christiansen | 56/203 |
| 3,706,189 | 12/1972 | Rutherford | 56/202 |
| 3,722,192 | 3/1973 | Corbett | 56/202 |
| 3,971,198 | 7/1976 | Lane | 56/202 |
| 3,974,631 | 8/1976 | Rhodes | 56/202 |
| 4,054,023 | 10/1977 | Carpenter | 56/202 |

*Primary Examiner*—Robert A. Hafer
*Attorney, Agent, or Firm*—Vogel, Dithmar, Stotland, Stratman & Levy

[57] ABSTRACT

Grass collection apparatus for attachment to a rotary power mower includes a platform mounted behind the mower and carrying thereon a grass container comprising an open-ended wire mesh cylinder, the lower end of which has removably attached thereto in surrounding relationship therewith a disposable plastic bag which is folded between the platform and the container. A stream of air and entrained grass clippings from the blade housing are directed by a conduit upwardly into the container through an inlet near the bottom thereof and against a perforated deflector comprising two concave sections intersecting in a cusp-like ridge disposed centrally of the inlet path. The deflector is inclined upwardly and inwardly of the container and is provided at the upper end with a downturned hood portion and operates to split the stream of air and entrained grass clippings to prevent the buildup of back pressure and to prevent the clippings from exiting the top of the container.

10 Claims, 8 Drawing Figures

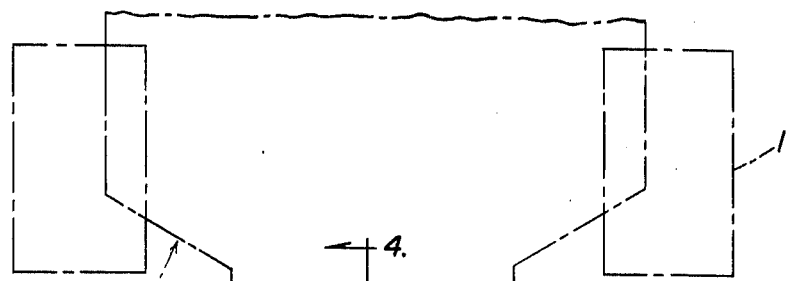
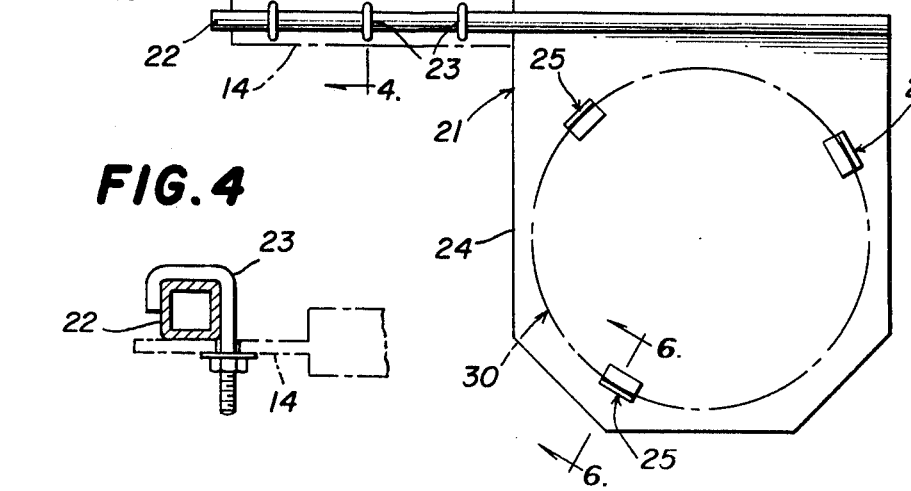
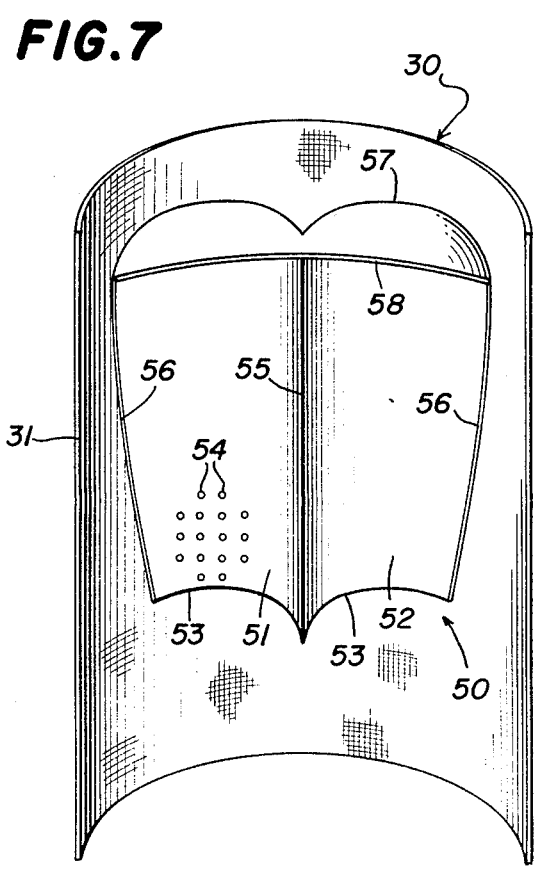
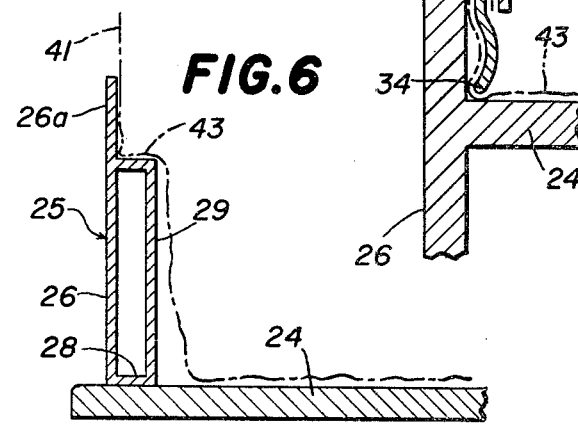
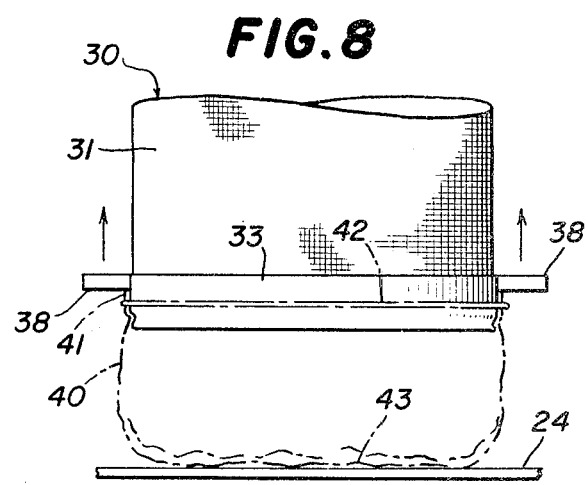

GRASS COLLECTION APPARATUS

BACKGROUND OF THE INVENTION

The present invention relates to apparatus for attachment to a rotary power mower for collecting the grass clippings cut thereby. In particular, this invention relates to grass collection apparatus for use with tractor-mounted or riding-type rotary mowers.

In such rotary mowing machines, the action of the blades serves to create a vacuum within the blade housing and generates a stream of air which is directed through an exhaust outlet to a collection container, the cut grass clippings being entrained in this airstream for delivery to the collection container. A major problem with such devices is the creation of substantial back pressure within the collection container. This back pressure tends to inhibit the flow of air and entrained clippings into the collection container, leading to clogging of the conduit means and, ultimately, the blade housing, and severely decreasing the vacuum created in the blade housing. This vacuum is essential for pulling the grass into an erect position for proper mowing action, and for sucking the grass clippings up into the blade housing and through the exhaust opening. Thus, a loss of vacuum both impairs mowing efficiency and serves to permit heavier clippings to fall back onto the lawn, thereby seriously interfering with the vacuum-cleaning action of the mower. The decreased airflow resulting from the loss of vacuum also fosters the buildup of scale on the blade housing and associated conduits.

Prior art grass collection systems for mowing machines have attempted to overcome this back pressure problem by several methods. Some such devices have utilized auxiliary blowers for maintaining negative pressure within the collection container. But this arrangement obviously entails considerable additional expense and complexity, and decreases the tractor power otherwise available for propelling the tractor and the mowing blade.

Other systems have utilized a collection container which is wholly or partially porous or of mesh-like construction so as to readily permit the escape of air therefrom. But even in such porous containers, the grass clippings will tend to quickly line the inside of the container walls, closing the openings therein and creating in effect a sealed closed container, whereupon back pressure rapidly builds up.

SUMMARY OF THE INVENTION

The present invention relates to an improved grass collection system for use with a rotary power mower which avoids the disadvantages of prior art devices, while affording other important operating and structural advantages.

It is a general object of this invention to provide grass collection apparatus for attachment to a rotary power mower which permits the collection of grass clippings in a container without the buildup of back pressure therein which would tend to clog the delivery system.

It is another object of this invention to provide a grass collection apparatus of the type set forth which is of simple and economical construction, and which permits the filtering of very fine grass particles too small to be noticed on the lawn, and permitting these fine particles to fall back upon the lawn and to provide natural fertilizer.

It is another object of this invention to provide grass collection apparatus of the type set forth which accommodates simple and efficient transfer of the grass clippings from a collection container to an associated storage container without spillage.

These and other objects of the invention are attained by providing grass collection apparatus for attachment to a rotary power mower having a blade housing with a grass discharge outlet therein for discharging therefrom a stream of air and entrained grass clippings, the apparatus comprising a frame adapted to be mounted on the associated mower, a mesh container mounted on the frame and having a grass inlet, the container having a mesh size such as to permit the free passage of air therethrough while inhibiting the passage of most grass clippings therethrough, duct means coupling the grass discharge outlet of the blade housing to the grass inlet of the mesh container for directing into the container the stream of air and entrained grass clippings generated by the blade, and deflector means mounted within the container for splitting the stream of air and entrained grass clippings to effect dispersal thereof within the container and away from the grass inlet with the air escaping through the container mesh, the deflector and the mesh container cooperating to prevent buildup of back pressure within the container and resultant clogging of the grass inlet and the duct means.

The invention, both as to its organization and method operation, together with further objects and advantages thereof, will best be understood by reference to the following specification taken in connection with the accompanying drawings.

BRIEF DESCRIPTION OF THE DRAWINGS

FIG. 3 is a top plan view of the apparatus of FIG. 1, rotated ninety degrees, with the grass collection container removed;

FIG. 4 is an enlarged view in vertical section taken along the line 4—4 in FIG. 3;

FIG. 5 is an enlarged fragmentary view in vertical section taken along the line 5—5 in FIG. 1;

FIG. 6 is an enlarged fragmentary view in vertical section taken along the line 6—6 in FIG. 3;

FIG. 7 is a fragmentary perspective view of a section taken along the line 7—7 in FIG. 2; and FIG. 8 is a fragmentary view of the lower end of the container of FIG. 1, shown partially raised for transferring the contents thereof to the associated disposable bag.

DESCRIPTION OF THE PREFERRED EMBODIMENT

Figure 1:
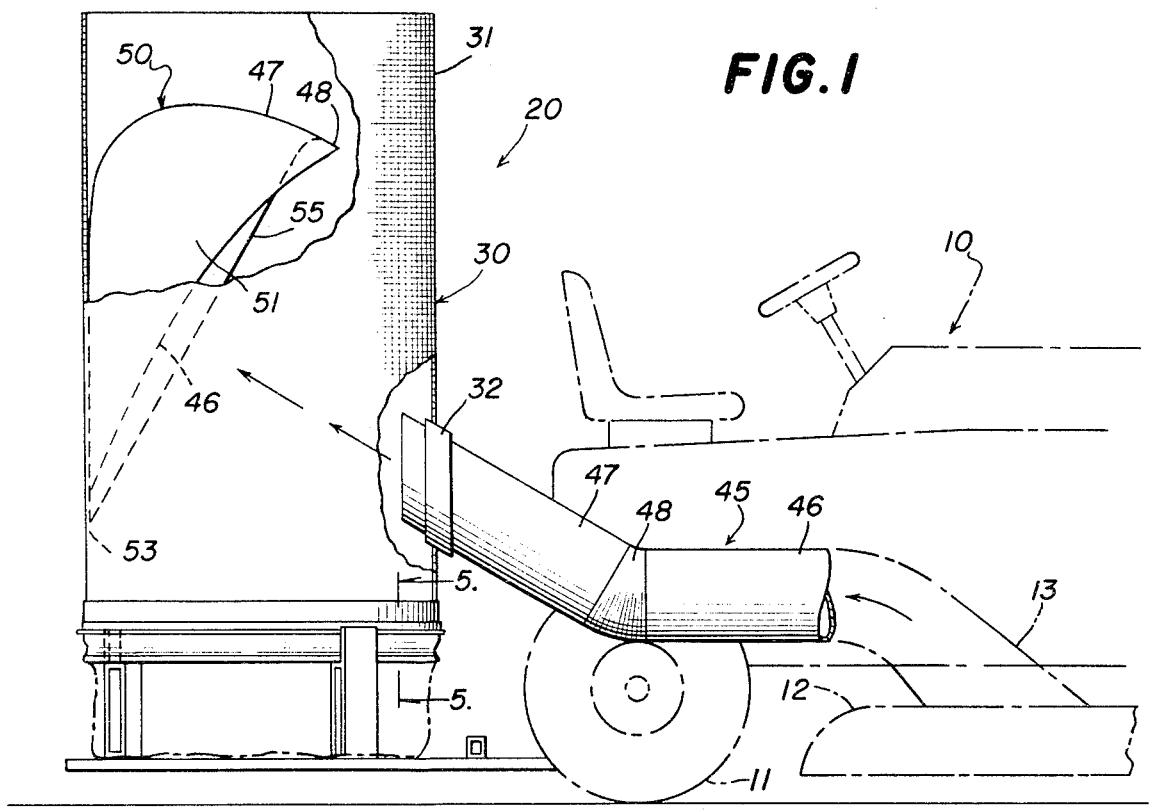
FIG. 1 is a side elevational view of a grass collection apparatus constructed in accordance with and embodying the features of the present invention, shown mounted on the back of a tractor, and with portions broken away more clearly to show the internal construction of the apparatus.

Referring to FIG. 1 of the drawings, there is illustrated a tractor 10 of the type utilized for carrying a rotary mowing deck forwardly of the rear wheels 11 of the tractor. The rotary mowing deck includes a blade housing 12 having a grass discharge outlet 13 therein. Connected to the tractor 10 at the rear end thereof is a hitch tongue 14 for coupling associated equipment to the tractor 10.

Referring also to FIGS. 2 through 4 and 6 of the drawings, there is mounted on the rear end of the tractor 10 a grass collection assembly, generally designated by the numeral 20, constructed in accordance with and embodying the features of the present invention. The grass collection assembly 20 includes a frame, generally designated by the numeral 21, which includes an elongated tubular coupling bar 22 which is substantially rectangular in transverse cross section and is secured to the hitch tongue 14 of the tractor 10 by a plurality of inverted J-bolts 23 (see FIG. 4). The coupling bar 22 extends laterally well beyond the edge of the hitch tongue 14 and has fixedly secured thereto, outboard of the hitch tongue 14, a flat horizontal platform 24 which extends rearwardly from the coupling bar 22. Fixedly secured to the upper surface of the platform 24 at equiangularly spaced-apart points therearound adjacent to the outer edge thereof are three upstanding retainers, each generally designated by the numeral 25. Referring to FIG. 6 of the drawings, each of the retainers 25 comprises a hollow, generally rectangular construction including an outer wall 26, short horizontal top and bottom walls 27 and 28 and an upstanding inner bearing wall 29, the outer walling 26 a predetermined distance upwardly above the top wall 27 to form a bearing flange 26a.

Referring also to FIGS. 5, 7 and 8 of the drawings, the grass collection assembly 20 also includes a collection container, generally designated by the numeral 30. The collection container 30 preferably comprises an upstanding wire mesh cylinder 31 open at the upper and lower ends thereof and provided in the side thereof adjacent to the lower end thereof with an inlet opening surrounded by an inlet ring 32. The bottom edge of the wire mesh cylinder 31 is trapped between a rigid outer ring 33 having an concave arcuate lower end 34 and a pair of vertically spaced apart inner rings 35, the rings 33 and 35 being fixedly secured together by a plurality of rivets 36 for securely clamping the lower end of the wire mesh cylinder 31 therebetween and providing a rigid bottom edge therefor. Fixedly secured to the outer ring 33 at diametrically opposed points therealong and extending radially outwardly therefrom are two handles 38 to facilitate movement of the collection container 30, as will be explained more fully below.

A disposable storage bag 40, preferably formed of plastic or the like, is secured to the lower end of the collection container 30. More particularly, the open upper rim 41 of the bag 40 is fitted around the outer ring 33 of the mesh cylinder 31 in surrounding relationship therewith, and is secured thereto by a retaining rope or band 42 wrapped therearound. In use, the bottom portion 43 of the bag 40 is folded beneath the bottom of the collection container 30, which is then placed on the top walls 27 of the retainers 25, the bearing flanges 26a serving to prevent lateral movement of the collection container 30 on the retainers 25. When thus mounted in this normal filling position, the platform 24 cooperates with the retainers 25 and the bag 40 to close the open bottom of the collection container 30 and retain collected grass clippings therein.

The collection container 30 is connected to the blade housing 12 by a duct, generally designated by the numeral 45, which includes an input section 46 communicating with the discharge outlet 13 of the blade housing 12 and an output section 47 communicating with the grass inlet of the collection container 30, the sections 46 and 47 being interconnected by a flexible elbow 48. It will be appreciated that the flexible elbow 48 accommodates orienting the duct 45 in different positions to facilitate use with different types of tractors and for mounting in different positions on a tractor.

Mounted within the collection container 30 is a deflector generally designated by the numeral 50, which includes two elongated concave sections 51 and 52 having the lower edges 53 thereof fixedly secured to the inner surface of the mesh cylinder 31 adjacent to the lower end thereof on the side opposite the grass inlet. Preferably, the deflector 50 is formed of metal having a plurality of perforations 54 therein of a size and number such as readily to permit the passage of air therethrough while preventing the passage of grass clippings therethrough. The concave sections 51 and 52 of the deflector 50 intersect at an elongated cusp-like ridge 55 which is inclined upwardly and inwardly of the mesh cylinder 31 in a position substantially centrally of the path of the grass clippings flowing into the collection container 30 through the grass inlet thereof. Preferably, the ridge 55 is inclined so as to lie in a plane substantially normal to the flow path of the grass clippings into the collection container 30. The lateral outer edges 56 of the concave sections 51 and 52 are also fixedly secured along the lower portions thereof to the inner surface of the mesh cylinder 31. The curvature of the concave sections 51 and 52 decreases toward the upper ends thereof, these upper ends being turned inwardly and downwardly to form a hood portion 57 which terminates in a flat downwardly extending lip 58.

Figure 2:
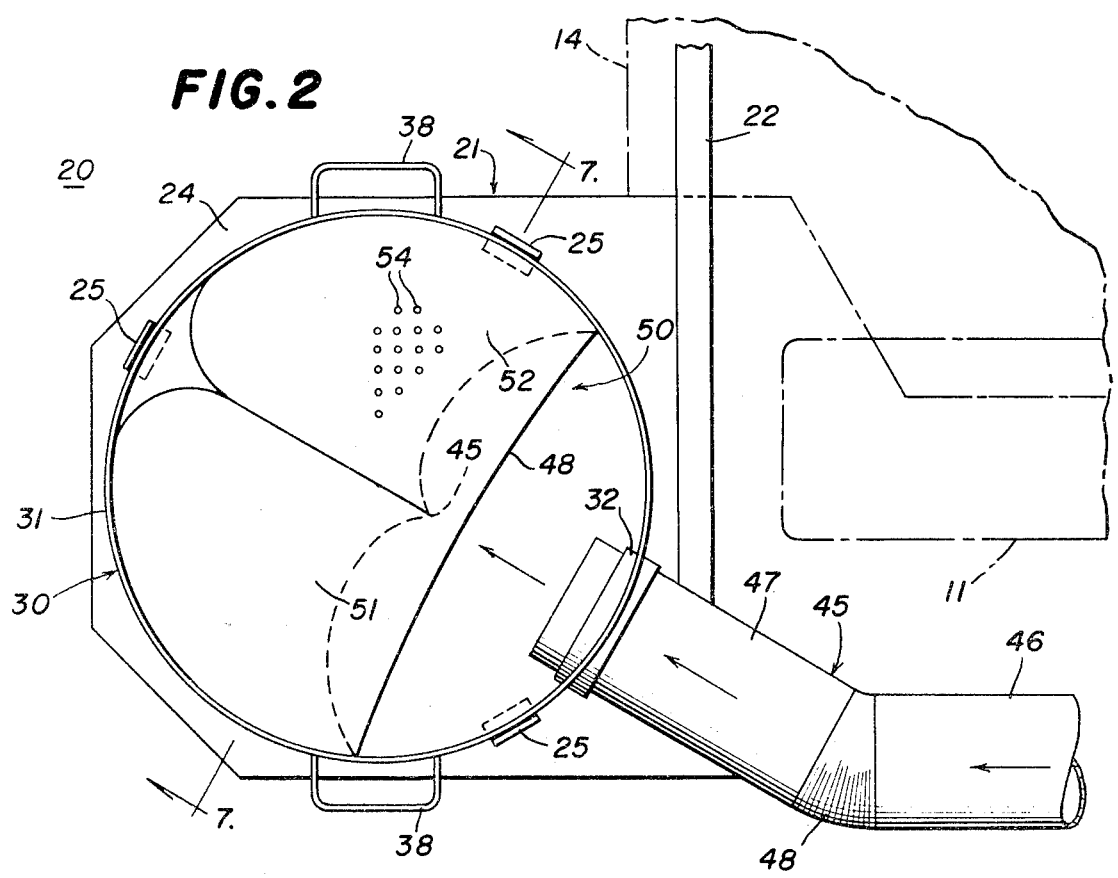
FIG. 2 is an enlarged top plan view of the grass collection apparatus of FIG. 1.

In operation, the blade of the mower creates a vacuum within the blade housing 12 and generates a flow of air through the discharge outlet 13 and the duct 45 into the collection container 30 in the direction indicated by the arrows in FIGS. 1 and 2, the grass clippings cut by the mower being entrained in this airstream. The airstream and the grass clippings entrained therein are directed against the deflector 50 and, more particularly, are directed upwardly against the ridge 55 of the deflector 50. Thus, it will be appreciated that the deflector 50 serves to split the stream of air and entrained grass clippings, dispersing them within the collection container 30 and away from the inlet ring 32. More particularly, the stream of air and entrained grass clippings will be directed laterally along the concave sections 51 and 52 of the deflector 50, as well as upwardly and downwardly therealong. The upwardly directed portion of the stream will be guided by the hood portion 57 and lip 58 of the deflector 50 back downwardly into the collection container 30, this hood portion 57 thereby preventing the escape of the upwardly directed portion of the stream of clippings from the open top of the mesh cylinder 31.

By thus dispersing the stream of air and entrained grass clippings away from in front of the inlet opening of the mesh cylinder 31, the deflector 50 serves to prevent the buildup of back pressure in the duct 45. Also, this dispersal of the airflow serves to prevent grass clippings from coating the inside surface of the mesh cylinder 31 and closing up the openings therein. As the collection container 30 fills up with grass clippings, the force of the airstream from the duct 45 will maintain an opening through the collected grass clippings in the collection container 30 from the inlet ring 32 to the deflector 50. As grass clippings fall into this airstream, they are simply picked up and blown out again against the deflector 50. Thus, these clippings never block up the duct 45. When the mower is turned off, the bore through the collected grass clippings created by the airstream from the mower will collapse, but will be recreated when the mower is turned on again.

Because back pressure is not permitted to build up in the collection container 30 and the duct 45, the vacuum in the blade housing 12 is never permitted to collapse. Thus, the buildup of scale in the blade housing 12 and the duct 45 is effectively prevented, and the vacuum lift of the mower is maintained to enhance the mowing efficiency of the unit. It is an important feature of the present invention that the mesh cylinder 31 is preferably formed of a mesh dimensioned to permit about 30 percent of the finest cut clippings to escape the collection container 30 and filter evenly back onto the lawn. These filtered clippings are too fine to be noticed on the lawn surface and will not cause matting that requires power raking, but will become a natural fertilizer that feeds the lawn and reduces the necessity for commercial fertilizers. The open top of the mesh cylinder 31 permits easy deposit of miscellaneous debris intended for the disposable storage bag 40, while the hood portion 57 of the deflector 50 prevents the escape of grass clippings from this open top.

When the collection container 30 becomes filled to a predetermined level with grass clippings, the mesh cylinder 31 is lifted vertically by means of the handles 38, as indicated in FIG. 8, to an emptying position, wherein the grass clippings fall into the disposable bag 40 which unfolds and fills as the mesh cylinder 31 is lifted. Thus, there is provided an automatic bagging of the contents of the collection container 30. The filled storage bag 40 is then detached from the mesh cylinder 31, and a new bag 40 is secured thereto and folded therebeneath as the collection container 30 is remounted on the platform 24.

In a constructional model of the present invention, the mesh cylinder 31 is preferably formed of a wire mesh having ½-inch mesh openings therein, the coupling bar 22, the platform 24 and the retainers 25 are all formed of aluminum, the duct 45 is formed of aluminum heating duct, and the deflector 50 is formed of perforated metal with ⅛-inch perforations at ⅜-inch spacings. Preferably, the mesh cylinder 31 has an overall height of approximately 36 inches and a diameter of about 18 inches and each of the retainers 25 has an overall height of approximately 8 inches, with the outer walls 26 having a height of approximately 6 inches. The deflector 50 has a height of about 22 inches and the ridge 55 is inclined at an angle of about 30 degrees to the side wall of the mesh cylinder 31.

From the foregoing, it can be seen that there has been provided an improved grass collection apparatus for use with a rotary power mower, which apparatus provides efficient grass collection while preventing buildup of back pressure, and at the same time permits automatic bagging of the collected grass clippings, all without the use of expensive auxiliary blowing equipment.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Grass collection apparatus for attachment to a rotary power mower having a blade housing with a grass discharge outlet therein for discharging therefrom a stream of air and entrained grass clippings, said apparatus comprising a frame adapted to be mounted on the associated mower, an open-top mesh container mounted on said frame and having a grass inlet adjacent to the lower end thereof, said container having a mesh size such as to permit the free passage of air therethrough while inhibiting the passage of most grass clippings therethrough, duct means coupling the grass discharge outlet of the blade housing to said grass inlet of said mesh container for directing upwardly into said container the stream of air and entrained grass clippings generated by the blade, and a deflector mounted within said container and including two elongated concave portions intersecting at a cusp-like ridge disposed substantially centrally of the path of the stream of air and entrained grass clippings entering said grass inlet and inclined upwardly and inwardly of said container from the perimeter thereof, said deflector splitting the stream of air and entrained grass clippings to effect dispersal thereof within said container and away from said grass inlet with the air escaping through the container mesh, said deflector including a flattened hood portion at the upper end thereof sloping downwardly toward the inlet side of said container for preventing grass particles traveling up said deflector from exiting the open top of said container, said deflector and said mesh container cooperating to prevent buildup of back pressure within said container and resultant clogging of said grass inlet and said duct means.

2. The grass collection apparatus of claim 1, wherein said deflector is perforated so as to permit passage therethrough of air while preventing passage therethrough of grass clippings.

3. The grass collection apparatus of claim 1, wherein the curvature of said concave portions of said deflector decreases toward the upper end thereof.

4. The grass collection apparatus of claim 1, wherein said container is cylindrical in shape having an open bottom, said frame including a platform for supporting said container thereon and cooperating therewith to close the bottom thereof.

5. The grass collection apparatus of claim 1, wherein said ridge lies in a plane disposed substantially normal to the direction of the stream of air and entrained grass clippings entering said grass inlet.

6. Grass collection apparatus for attachment to a rotary power mower having a blade housing with a grass discharge outlet therein for discharging therefrom a stream of air and entrained grass clippings, said apparatus comprising a platform adapted to be mounted on the associated mower, an open-bottom mesh container adapted to be mounted on said platform and having a grass inlet, said container having a mesh size such as to permit the free passage of air therethrough while inhibiting the passage of most grass clippings therethrough, a disposable bag removably attached to said container and closing the bottom thereof, duct means coupling the grass discharge outlet of the blade housing to said grass inlet of said mesh container for directing into said container the stream of air and entrained grass clippings generated by the blade, and deflector means mounted within said container for splitting the stream of air and entrained grass clippings to effect dispersal thereof within said container and away from said grass inlet with the air escaping through the container mesh, said container being movable between a normal filling position mounted on said platform with said disposable bag folded between said platform and the bottom of said container and an emptying position elevated above said platform with said disposable bag expanded on said platform for receiving the contents of said container, said deflector and said mesh container cooperating to prevent buildup of back pressure within said container and resultant clogging of said grass inlet and said duct means.

7. The grass collection apparatus of claim 6, wherein the lower end of said container is disposed within the upper end of said disposable bag, and further including an attachment band encircling the overlapping portions of said container and said disposable bag securely to hold said bag in place on said container.

8. The grass collection apparatus of claim 6, and further including a plurality of spaced-apart retainers extending upwardly from said platform and engageable with said container for retaining it in place on said platform.

9. The grass collection apparatus of claim 6, and further including handle means mounted on said container for facilitating movement thereof between the filling and emptying positions thereof.

10. The grass collection apparatus of claim 6, wherein said container comprises an open-ended cylinder of wire mesh.

* * * * *